United States Patent
Sun et al.

(10) Patent No.: US 11,457,394 B2
(45) Date of Patent: Sep. 27, 2022

(54) MULTI-LINK AGGREGATION ARCHITECTURE AND OPERATIONS

(71) Applicants: Sheng Sun, Ottawa (CA); Yan Xin, Ottawa (CA); Osama Aboul-Magd, Ottawa (CA); Jung Hoon Suh, Ottawa (CA)

(72) Inventors: Sheng Sun, Ottawa (CA); Yan Xin, Ottawa (CA); Osama Aboul-Magd, Ottawa (CA); Jung Hoon Suh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/194,613

(22) Filed: Mar. 8, 2021

(65) Prior Publication Data

US 2021/0289417 A1 Sep. 16, 2021

Related U.S. Application Data

(60) Provisional application No. 62/988,315, filed on Mar. 11, 2020.

(51) Int. Cl.
| | |
|---|---|
| H04W 40/02 | (2009.01) |
| H04W 40/30 | (2009.01) |
| H04W 84/12 | (2009.01) |
| H04W 80/02 | (2009.01) |
| H04L 45/24 | (2022.01) |
| H04L 47/41 | (2022.01) |
| H04W 28/02 | (2009.01) |

(52) U.S. Cl.
CPC .......... *H04W 40/02* (2013.01); *H04L 45/245* (2013.01); *H04L 47/41* (2013.01); *H04W 28/0205* (2013.01); *H04W 40/30* (2013.01); *H04W 80/02* (2013.01); *H04W 84/12* (2013.01)

(58) Field of Classification Search
CPC ..... H04W 84/12; H04W 80/02; H04W 40/02; H04W 40/30; H04W 28/0205; H04L 45/245; H04L 47/41
See application file for complete search history.

(56) References Cited

U.S. PATENT DOCUMENTS

| | | | |
|---|---|---|---|
| 10,324,740 B1* | 6/2019 | Poplack | G06F 9/455 |
| 2008/0059792 A1* | 3/2008 | Feder | H04W 12/041 |
| | | | 380/270 |
| 2009/0323646 A1* | 12/2009 | Ketchum | H04L 25/03343 |
| | | | 370/338 |

(Continued)

FOREIGN PATENT DOCUMENTS

| | | |
|---|---|---|
| CN | 104980988 A | 10/2015 |
| CN | 110417650 A | 11/2019 |
| CN | 110832951 A | 2/2020 |

OTHER PUBLICATIONS

Xiaofei Wang et al, Carrier Grade Wi-Fi: Air Interface Requirements and Technologies, IEEE Long Island Systems, Applications and Technology (LISAT) Conference 2014, Jun. 2014,6 pages.

*Primary Examiner* — Kan Yuen

(57) ABSTRACT

A reference architecture is described for supporting multi-link aggregation (MLA) operation. A MLA muxer logical layer is provided, which provides a synchronization function to synchronize data transmission over two or more subordinate air interfaces belonging to an aggregated link.

20 Claims, 13 Drawing Sheets

(56) References Cited

U.S. PATENT DOCUMENTS

| | | | | |
|---|---|---|---|---|
| 2011/0038267 A1* | 2/2011 | Smith | ............... | H04L 43/50 |
| | | | | 370/248 |
| 2012/0275297 A1* | 11/2012 | Subramanian | ........ | H04L 45/245 |
| | | | | 370/389 |
| 2013/0287038 A1* | 10/2013 | Zhou | ............... | H04L 69/28 |
| | | | | 370/410 |
| 2017/0366270 A1* | 12/2017 | Ashrafi | ............ | H04L 27/36 |
| 2018/0054847 A1* | 2/2018 | Cariou | ............ | H04W 28/08 |
| 2019/0082373 A1 | 3/2019 | Patil et al. | | |
| 2022/0014965 A1* | 1/2022 | Kawamura | ......... | H04W 28/065 |

* cited by examiner

Current state

| Events & Messages | State 1 | State 2 | State 3 | State 4 |
|---|---|---|---|---|
| State 1 | self-Looping | MLME_peeringML Timeout | MLME_forcedMLD own | MLME_forcedMLD own |
| State 2 | ML Peering Request and Response | self-Looping (Timed) | N/A | MLME_measurem entMLFailure |
| State 3 | N/A | MLME_MLA PeeringSuccess | self-Looping (Timed) Note: if no traffic for preset timer, it would switch to State 4 | MLME_measurem entMLSuccess |
| State 4 | N/A | N/A | ML Timed Measurement | self-Looping (Timed) |

Next state

FIG. 5

| Type value B3 B2 | Type description | Subtype value B7 B6 B5 B4 | Subtype description |
|---|---|---|---|
| 00 | Management | 1111 | MLA Management Frame Transmission |
| 10 | Data | 1101 | MLA MPDU Data Transmission |

FIG. 11B

MULTI-LINK AGGREGATION ARCHITECTURE AND OPERATIONS

CROSS-REFERENCE TO RELATED APPLICATIONS

The present disclosure claims priority to U.S. provisional patent application No. 62/988,315, entitled "MULTI-LINK AGGREGATION ARCHITECTURE AND OPERATIONS", filed Mar. 11, 2020, the entirety of which is hereby incorporated by reference.

FIELD

The present disclosure relates to WiFi communications, in particular methods and systems for supporting aggregation of multiple air interfaces.

BACKGROUND

IEEE 802.11 be, which is an upcoming standard for WiFi communications, defines a technical feature which enables aggregation of multiple air interfaces (also referred to as multi-link aggregation (MLA)) to support higher throughput, load balancing and higher reliability. MLA may also be referred to interchangeably as multi-link operation (MLO). The present disclosure makes reference to MLA, however it should be understood that reference to MLA may be equally understood to refer to MLO. In order for MLA to be of practical use in WiFi communications, implementation of MLA should take into account the nature of air interfaces (also referred to as over-the-air or wireless links or interfaces), for example that the state of air interfaces can quickly change or degrade in quality (e.g., due to changes in environment and/or mobility of a station). Reliability of transmissions also is a concern, as well as security of transmissions.

Accordingly, there is a need to provide a reference architecture to support such MLA operation for air interfaces.

SUMMARY

In various examples, the present disclosure describes a reference architecture for supporting MLA operation and functions, as well as methods and systems for supporting MLA over air interfaces.

Examples described herein may enable implementation of MLA to be more automatic and deterministic when the intended air interfaces are ready and in associated state. Examples described herein may enable MLA to be reconfigurable relatively quickly (e.g., using dynamic or near real-time reconfiguration), when there is a change in the states of the air interfaces. The disclosed examples may provide for relatively efficient switchability between aggregated and non-aggregated operation. The disclosed examples may enable implementation of MLA with relatively high reliability and relatively low risk of duplication and/or misordering of transmissions. Further, security of transmission of data frames in MLA may be ensured, using examples described herein.

In some examples, the disclosed reference architecture includes a MLA muxer logical layer which is an abstract MAC layer sitting on top of a number of air interfaces. The MLA muxer may be used to perform MSDU multiplexing and de-multiplexing functions. Additionally, a synchronization function may be provided to perform quasi-synchronization among multiple air interfaces, which may help to further improve performance.

Implementation of the MLA muxer as a logical layer on top of existing physical layers may enable air interfaces that are subordinate to the aggregate link to nonetheless function independently, including maintaining independent security associations. This may enable more robust security for data transmission.

In some examples, the present disclosure describes states of operation for implementing the MLA muxer. State-based operation of the MLA muxer may enable more efficient switching between aggregated and non-aggregated operation. State-based operation may enable the MLA muxer to readily switch to quasi-periodic maintenance and reconfiguration functions, as required.

In some examples, protocols and signaling for enabling various MLA functions on MLA capable APs and/or STAs are also described. Example frame formats are also described, to help ensure correct demuxing of received transmissions.

In some examples, the present disclosure describes an apparatus for wireless communications. The apparatus includes a network interface supporting a plurality of air interfaces for wireless communication with at least one network entity; and a processor coupled to the network interface. The processor is configured to execute instructions to: implement a multi-link aggregation (MLA) multiplexer (muxer) as a logical layer, the MLA muxer providing at least a synchronization function to synchronize data transmission to the at least one network entity, the transmission being conducted over two or more subordinate air interfaces belonging to an aggregated link.

In some examples, the present disclosure describes a method for wireless communications. The method includes: implementing a multi-link aggregation (MLA) multiplexer (muxer) as a logical layer, the MLA muxer providing at least a synchronization function to synchronize data transmission to at least one network entity, the transmission being conducted over two or more subordinate air interfaces belonging to an aggregated link.

In any of the above examples, implementation of the MLA muxer may include: a data distributor responsible for assigning data to each subordinate air interface for transmission; a data collector responsible for receiving data from each subordinate air interface and reassembling the received data; and a MLA manager providing at least the synchronization function.

In any of the above examples, each subordinate air interface may maintain a respective independent security association for data transmission.

In any of the above examples, the MLA muxer may operate in one of: a down state in which the plurality of air interfaces do not participate in any aggregated link; an initialization state in which the MLA muxer communicates with the at least one network entity to establish the aggregated link using the two or more subordinate air interfaces; an operational state in which transmission to the at least one network entity is conducted over the aggregated link; or a maintenance state in which the MLA muxer obtains information about operational status of each subordinate air interface to ensure links established over each subordinate air interface are operational.

In any of the above examples, the MLA muxer may transition from the operational state to the maintenance state after expiry of a timer.

In any of the above examples, the timer may be paused or reset when there is traffic over the aggregated link.

In any of the above examples, the synchronization function may include: obtaining information from each subordinate air interface about a duration of a respective contention window; and configuring each subordinate air interface to use a new contention window that is a maximum of the respective contention windows.

In any of the above examples, the synchronization function may include: for at least one subordinate air interface, padding transmission over the at least one subordinate air interface, to cause data transmission over each subordinate air interface to end synchronously.

In any of the above examples, the data transmitted over the aggregated link may be a MAC protocol data unit (MPDU) having a frame format, wherein the frame format may include an address field indicating a logical MAC address associated with the MLA muxer, to indicate a source of the MPDU.

In any of the above examples, the frame format may further include a frame control field containing bit values indicating a message type of the MPDU.

In some examples, the present disclosure describes a non-transitory computer-readable medium having instructions encoded thereon, wherein the instructions, when executed by a processor of an apparatus, cause the apparatus to implement any of the above examples.

BRIEF DESCRIPTION OF THE DRAWINGS

Reference will now be made, by way of example, to the accompanying drawings which show example embodiments of the present application, and in which:

FIG. 5 is a state transition table showing some example signals for transitioning between the states shown in FIG. 4;

FIGS. 11A and 11B show details of an example frame control field for indicating MLA MPDU data transmission.

Similar reference numerals may have been used in different figures to denote similar components.

DESCRIPTION OF EXAMPLE EMBODIMENTS

The present disclosure describes a reference architecture to support multi-link aggregation (MLA) for air interfaces. MLA enables multiple air interfaces to jointly serve traffic, by treating the multiple air interfaces as a single aggregated link. MLA may also be referred to interchangeably as multi-link operation (MLO). The present disclosure makes reference to MLA, however it should be understood that reference to MLA may be equally understood to refer to MLO. Multiple air interfaces aggregated together in this manner may be referred to as an aggregated link or a multi-link, as a logical shorthand. The interfaces that have been aggregated together in an aggregated link may be referred to as subordinate interfaces (or subordinate links). An air interface may also be referred to as an over-the-air interface, wireless interface, WiFi interface, over-the-air link, wireless link, or WiFi link, among other common terms. In various examples, the present disclosure also describes protocols and functions for supporting MLA for air interfaces. Transmissions over an aggregated link may be referred to as MLA transmissions, and may involve individual transmissions over each individual subordinate air interface. Examples disclosed herein may be built on and/or compatible with existing IEEE 802.11 layers.

To assist in understanding the present disclosure, an example system supporting wireless communications over air interfaces is first described.

Figure 1A:
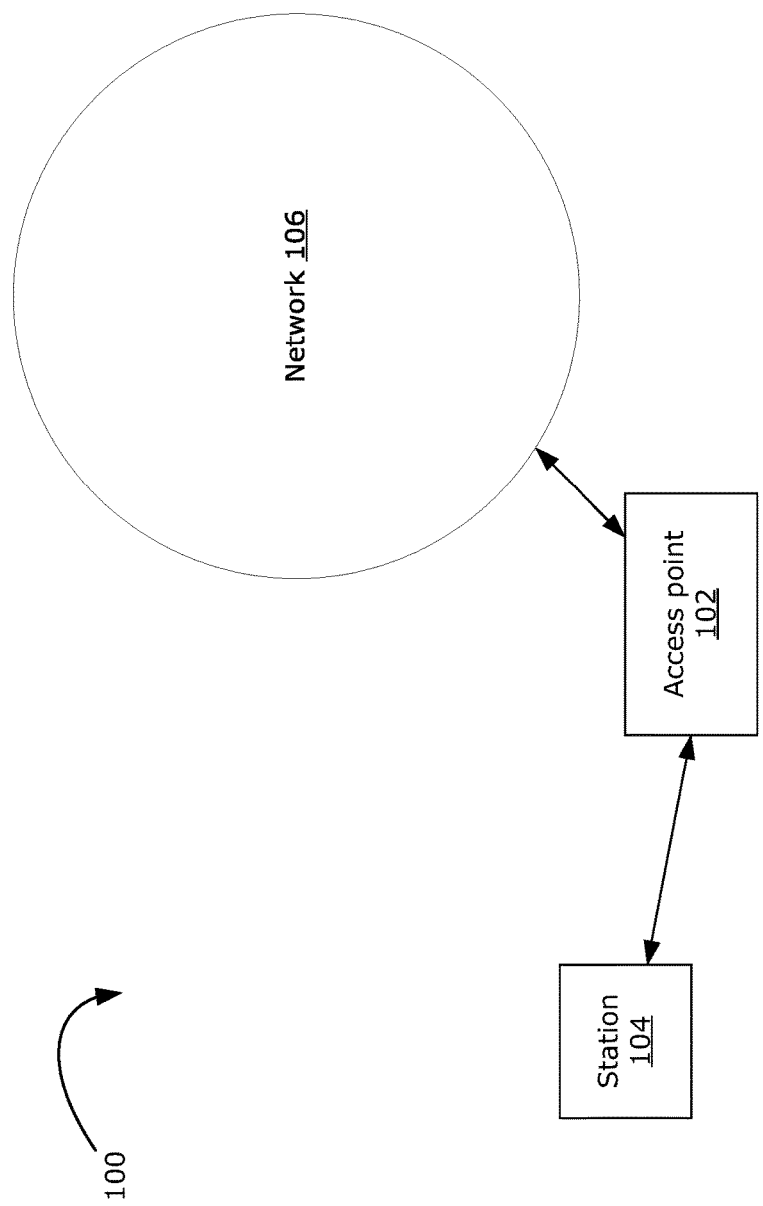
FIG. 1A is a schematic diagram illustrating an example system for EDMG communications between a STA and the network.

FIG. 1A is a schematic diagram of an example system 100 in which methods described herein may be implemented. The system 100 shown in FIG. 1A may support a wireless local area network (WLAN) including an access point (AP) 102 and multiple stations (STAs) 104 within coverage of the AP 102. In the example shown, there is only one STA 104 and one AP 102, however there may be multiple STAs 104 and/or multiple APs 102. Each STA 104 may be any suitable device capable of wireless communication, including mobile or stationary devices such as smartphones, laptops, mobile phones or tablet devices, for example, and the STAs 104 need not be the same as each other. The STAs 104 may also be referred to as terminals, user devices, user equipment (UE) or clients, for example. The AP 102 may be also referred to as a personal basic service set (PBSS) coordinate point (PCP) or a base station. The AP 102 may be implemented as a router, for example. The STA 104 may access a network 106 via the AP 102.

The system 100 may support communication between the AP 102 and each STA 104, as well as communication directly between STAs 104 (also referred to as device-to-device communication). Using multiple antennas, the AP 102 may carry out multi-user transmissions (e.g., transmissions from the AP 102 to multiple STAs 104 simultaneously) by using the spatial reuse technique of multi-user multiple-input multiple-output (MU-MIMO). For simplicity, examples described herein may refer to wireless communications over air interfaces between a STA 104 and an AP 102, however it should be understood that the present disclosure may be equally applicable to wireless communications over air interfaces between two STAs 104, multi-user communications (e.g., between an AP 102 and multiple STAs 104), or any other wireless communications over air interfaces.

Figure 1B:
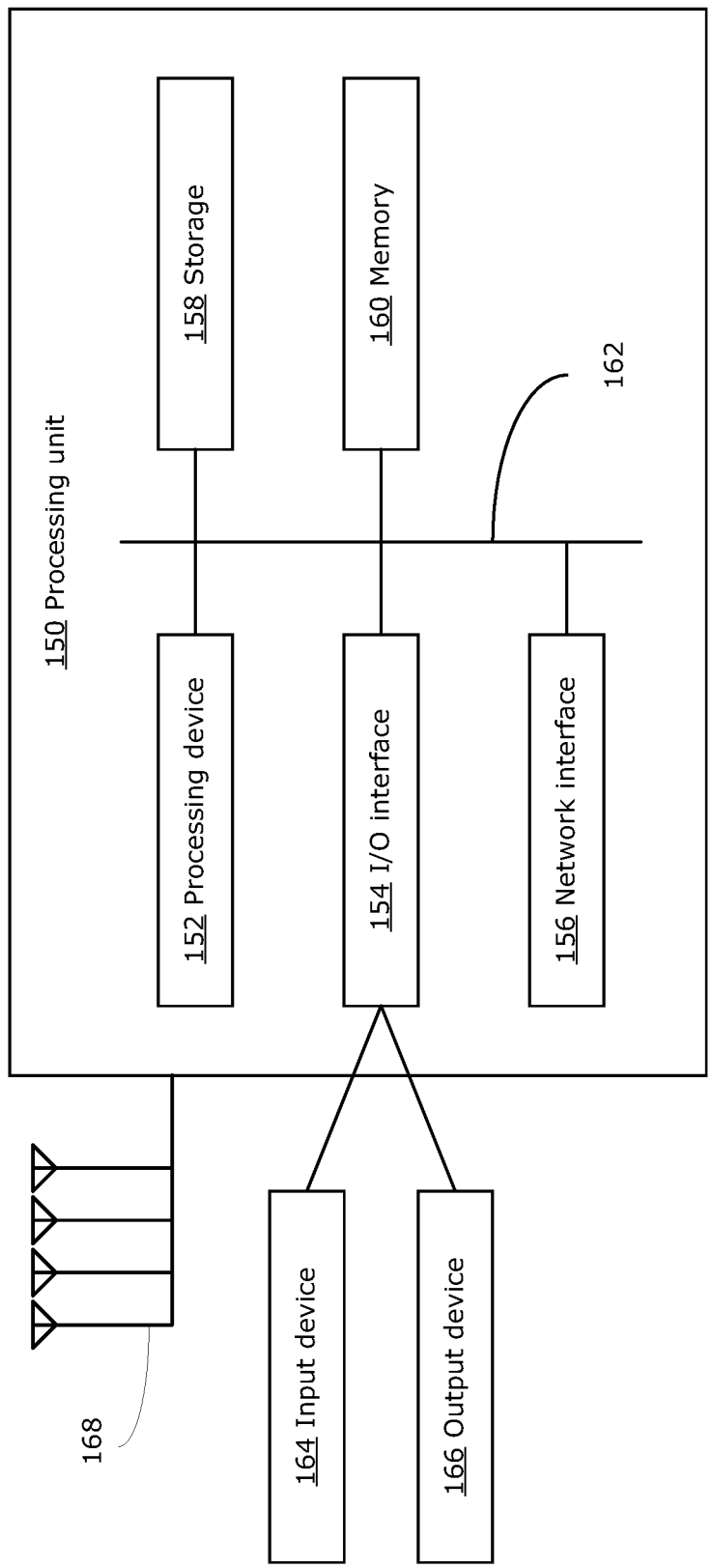
FIG. 1B is a block diagram illustrating an example device suitable for EDMG communications.

FIG. 1B is a block diagram illustrating an example processing unit 150, which may be used to implement the methods and systems disclosed herein, for example the AP 102 and/or one or more of the STAs 104. Other processing units suitable for implementing the present disclosure may be used, which may include components different from those discussed below. Although FIG. 1B shows a single instance of each component, there may be multiple instances of each component in the processing unit 150.

The processing unit 150 includes one or more processing devices 152, such as a processor, a microprocessor, an application-specific integrated circuit (ASIC), a field-programmable gate array (FPGA), a dedicated logic circuitry, or combinations thereof. The processing unit 150 may also include one or more input/output (I/O) interfaces 154, which may enable interfacing with one or more appropriate input devices 164 and/or output devices 166. The processing unit 150 includes one or more network interfaces 156 for wired or wireless communication with the network 106 (e.g., an intranet, the Internet, a P2P network, a WAN, a LAN, and/or a Radio Access Network (RAN)). The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. There may be a plurality of such antenna arrays. The processing unit 150 may also include one or more storage units 158, which may include a mass storage unit such as a solid state drive, a hard disk drive, a magnetic disk drive and/or an optical disk drive.

The processing unit 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. For example, instructions for implementing a logical layer for supporting MLA (as described further below) may be stored in the memory(ies) 160.

The memory(ies) 160 may include other software instructions, such as for implementing an operating system and other applications/functions. In some examples, one or more data sets and/or module(s) may be provided by an external memory (e.g., an external drive in wired or wireless communication with the processing unit 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing unit 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing unit 150. In other examples, one or more of the input device(s) 164 and/or the output device(s) 166 may be included as a component of the processing unit 150. In other examples, there may not be any input device(s) 164 and output device(s) 166, in which case the I/O interface(s) 154 may not be needed.

The AP 102 and STAs 104 may each include multiple antenna elements 168 forming antenna arrays, and may carry out appropriate beamforming and beam steering controls (e.g., using beamsteering circuits and/or beamsteering control modules implemented by the processing device 152 and processing unit 150), in order to carry out wireless communication over air interfaces.

Figure 2:
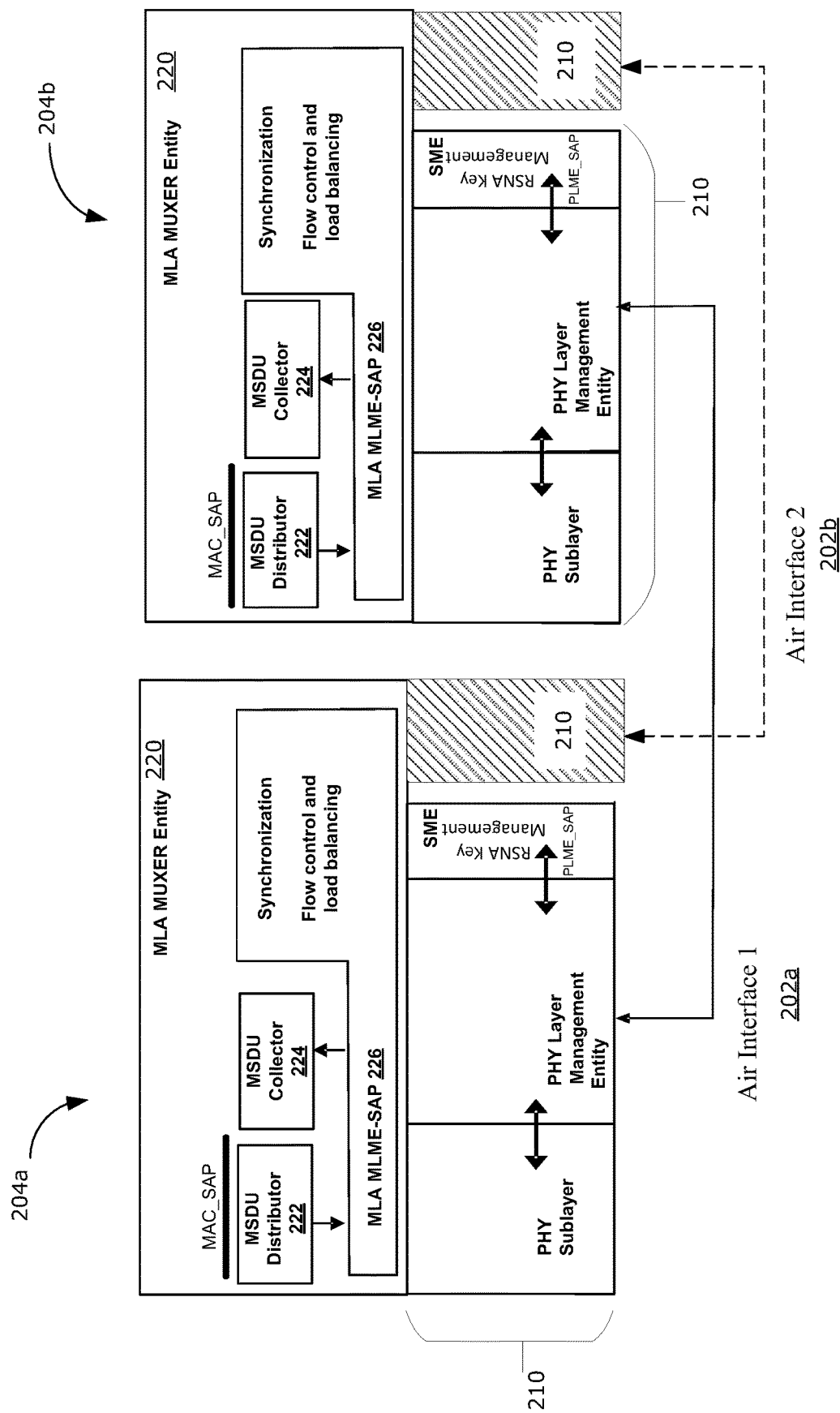
FIG. 2 is a block diagram illustrating an example of the disclosed reference architecture for supporting MLA.

FIG. 2 illustrates an example of the disclosed reference architecture for supporting MLA operations. In this example, the reference architecture is shown for MLA of two air interfaces between two entities, however it should be understood that this is exemplary and not intended to be limiting. For example, there may be more than two air interfaces established between the two entities and/or there may be more than two entities in communications with each other over respective one or more air interfaces.

In this example, two network entities 204a, 204b are in communication with each other over air interface 1 202a and air interface 2 202b (generally referred to as air interface(s) 202). The air interfaces 202a, 202b are grouped together using MLA, but function independently of each other. Each entity 204a, 204b may be any network entity in wireless communication with each other. For example, one entity 204a may be the AP 102 and another entity 204b may be a STA 104. It should be understood that air interfaces 202 may be established between any other network entity, not necessarily limited to communications between the AP 102 and the STA 104.

Each of the entities 204a, 204b includes a physical (PHY) layer 210. Each air interface 202a, 202b is managed over a respective instance of the PHY layer 210 at each of the entities 204a, 204b (for simplicity, only one instance of the PHY layer 210 at each entity 204a, 204b is shown in detail; the hatched region should be understood to have similar details). The PHY layer 210 may be in accordance with existing standards. In this example, each instance of the PHY layer 210 includes a PHY sublayer; a PHY layer management entity (PLME) interfacing with the PHY sublayer; and a station management entity (SME) interfacing with the PHY layer management entity via a PLME_SAP. Robust security network association (RSNA) key management is provided by the SME. Notably, each air interface 202 is independently established over a respective instance of the PHY layer 210, with independent security and association management.

On top of the PHY layer is the disclosed MLA multiplexing (or muxer) entity 220 (also referred to as simply MLA muxer 220 in some examples). Although referred to as an "entity" in some examples, the MLA muxer 220 is not a separate hardware entity in the network, but rather a logical entity (or logical layer) that is instantiated within a physical network entity (e.g., within the AP 102 or STA 104). The MLA muxer 220 represents an overall MAC service access point (SAP) layer that serves to execute the operations and management functions of the MLA, which will be described in detail further below. The MLA muxer 220 includes a MAC service data unit (MSDU) distributor 222 (or more generally a data distributor), a MSDU collector 224 (or more generally a data collector), and a MLA MAC layer management entity (MLME)-SAP 226 (or more generally a MLA manager). The MSDU distributor 222 is responsible for MSDU dissemination over the transmitting MLA air interfaces 202. The MSDU collector 224 is responsible for MSDU receiving and assembly over the receiving MLA air interfaces 202. The MLA MLME-SAP 226 performs the functions of managing the lifecycle and state machine of the MLA muxer 220. The MLA MLME-SAP 226 provides synchronization functions, which manage transmission and receiving of MLA data transmissions. The MLA MLME-SAP 226 also provides flow control and load balancing functions. Further details of the MLA muxer 220 and its functions are provided further below.

The example disclosed reference architecture may provide more flexibility, in that each air interface 202 may be independently established over the existing PHY layer, using existing authentication and association procedures (e.g., as defined in existing IEEE 802.11 standards). There is no need to change the physical interface stack. Further, if MLA reconfiguration is required, renegotiation of security of the links is not required, which may help to reduce latency.

The example disclosed reference architecture may also provide greater reliability. For example, in the case where an air interface "flip-flops" between states (e.g., due to unstable or rapidly changing conditions), the MLA muxer 220 may detect the problem and redistribute traffic with little or no disruption to the traffic.

The example disclosed reference architecture may enable MLA implementation with reduced complexity. As mentioned above, the MLA muxer 220 does not affect the physical layer or security of the air interfaces 202. Rather, the MLA muxer 220 serves to process and manage distribution and collection of MSDU, and provides some synchronization functions. Accordingly, the need to devise new algorithms for managing the security and physical layer of the interfaces 202 is avoided.

Figure 3:
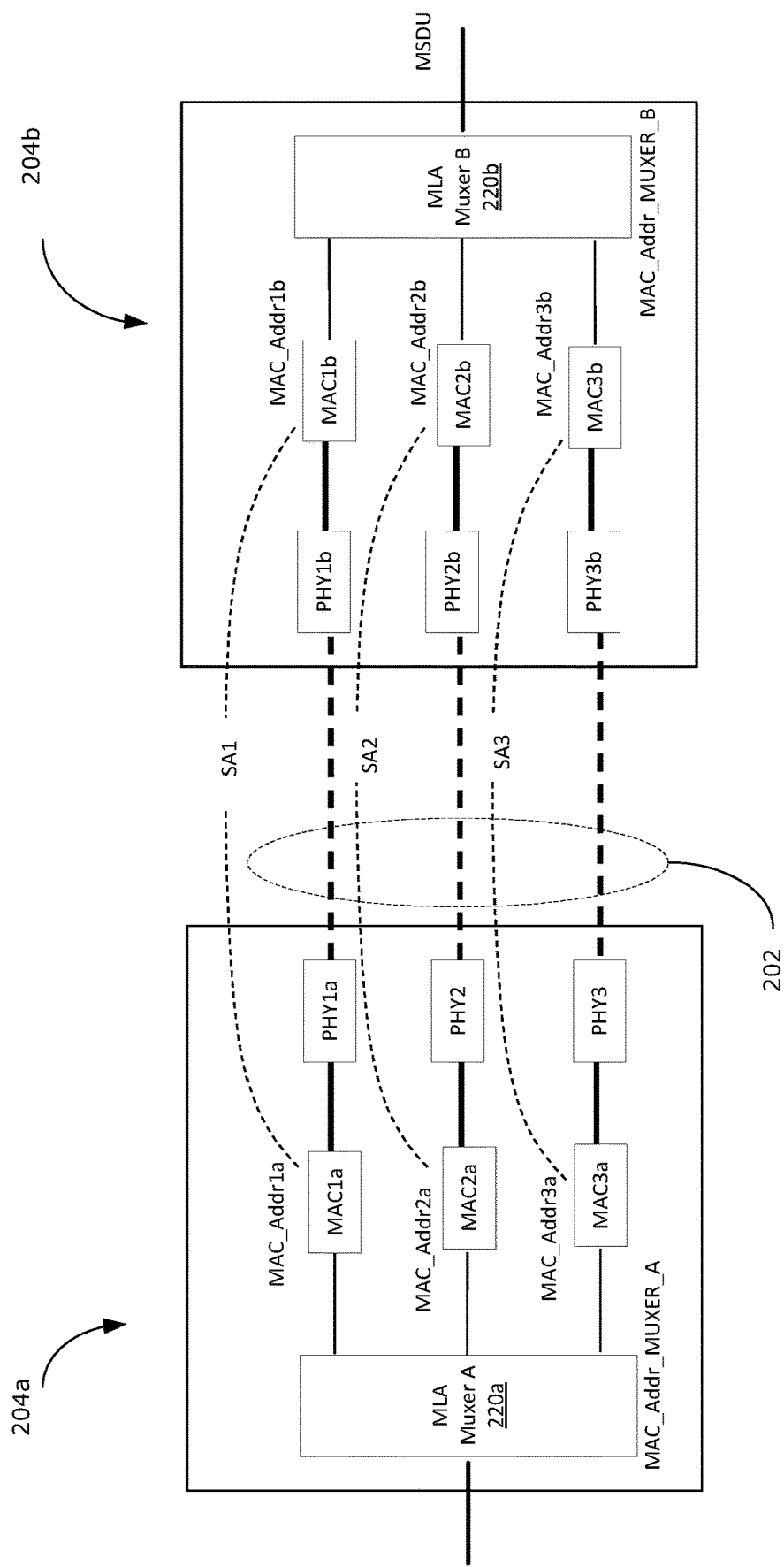
FIG. 3 is a block diagram illustrating an example of MLA operation using the reference architecture of FIG. 2.

FIG. 3 is a block diagram illustrating an example of MLA operation using the reference architecture described above. In this example, the first entity 204a (in the role of a transmitter) is transmitting MSDU to the second entity 204b (in the role of a receiver). FIG. 3 shows three air interfaces 202, which are grouped together by MLA. Each air interface 202 is established via respective independent instances of PHY and MAC layers, and respective independent security associations (SAs). In this example, a first air interface 202 is established between MAC1a and PHY1a at the first entity 204a and MAC1b and PHY1b at the second entity 204b, and the first air interface 202 has a first SA1. Similarly, a second air interface 202 is established between MAC2a and PHY2a at the first entity 204a and MAC2b and PHY2b at the second entity 204b, and the second air interface 202 has a second SA2; and a third air interface 202 is established between MAC3a and PHY3a at the first entity 204a and MAC3b and PHY3b at the second entity 204b, and the third air interface 202 has a third SA3. Each MAC instance is associated with a respective MAC address (shown in FIG. 3 as MAC_Addr1a, MAC_Addr2a, etc.), which may be used in frame headers to properly route the data transmissions.

Each entity 204a, 204b has a respective instance of the MLA muxer 220a, 220b, which respectively distributes/collects the transmitted/received MSDUs. Each MLA muxer 220a, 220b is associated with a respective MAC address (MAC_Addr_Muxer_A and MAC_Addr_Muxer_B, respectively; generally MAC_Addr_Muxer).

Each air interface 202 maintains independent MAC protocol data unit (MPDU) transmission, and each air interface 202 also maintains individual, independent security association. This independency helps to reduce the impact on chip design, and reduces or avoids added complexity to hardware and software implementation.

Figure 4:
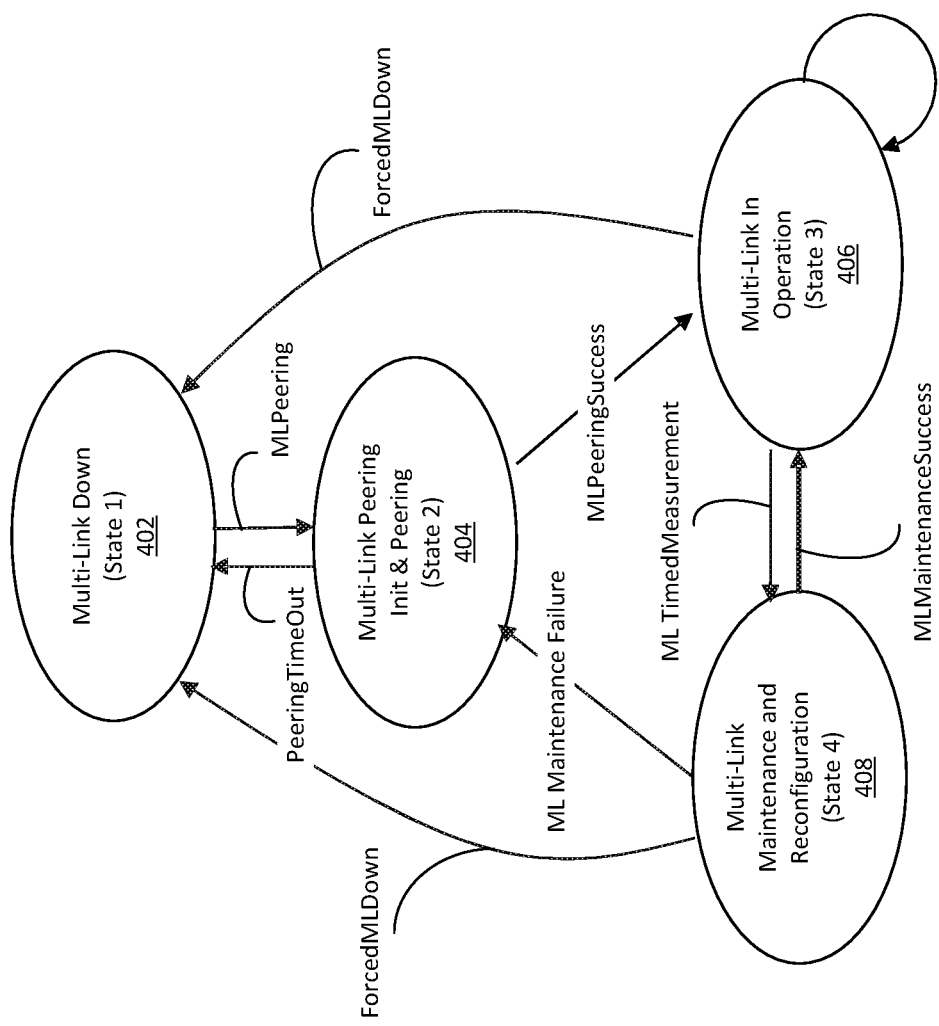
FIG. 4 is a state diagram illustrating example states for supporting MLA operation.

FIG. 4 is a state diagram illustrating example states that the MLA muxer 220 may operate in. These states may be implemented as a state machine in the MLA muxer 220. Four states of operation are described for the disclosed MLA muxer 220: Multi-link down state 402 (also referred to as state 1 or down state); multi-link peering initialization and peering state 404 (also referred to as state 2 or initialization state); multi-link in operation state 406 (also referred to as state 3 or operational state); and multi-link maintenance and reconfiguration state 408 (also referred to as state 4 or maintenance state).

In the down state 402, MLA is not in use and air interfaces are operating as independent, individual links.

In the initialization state 404, information is exchange between network entities to obtain information about the status of individual air interfaces, in order to establish MLA.

In the operational state 406, MLA has been successfully established and the aggregated link are in use for transmission and reception of data between network entities.

In the maintenance state 408, checks are performed (e.g., by the AP 102) to ensure the established links are still operational (e.g., not congested, not degraded, etc.). If required, reconfiguration may be performed to maintain operation of the aggregated link (e.g., dropping a poorly-performing link from the aggregation and rerouting traffic accordingly).

It should be noted that the MLA muxer 220 may be implemented using only the down state 402, initialization state 404 and operational state 406 (i.e., without requiring the maintenance state 408). For example, it may be assumed that once MLA has been established to aggregate a given set of air interfaces, the aggregated link will be sufficiently operational for the required life of the aggregated link (e.g., in situations where aggregated links are expected to be short-lived, such as for relatively small-sized data units).

Generally, it may be useful for the ML muxer 220 to be implemented with the maintenance state 408 also, to help ensure sufficient quality of operation of aggregated links and help improve user experience (e.g., reducing the number of failed transmissions and/or retransmissions).

FIG. 4 also shows some signals that may trigger transition from one state to another state. It should be understood that the indicated signals are exemplary and not intended to be limiting. Different signals may be used in place of or in addition to those shown, to cause transition from one state to the next.

FIG. 5 is a state transition table showing some example signals for transitioning between the states shown in FIG. 4. In the state transition table shown, the current state is indicated across the top, the next state is indicated along the left, and example signals for transitioning from the current state to the next state is indicated in the table entries. Where transition from one state to another state is not possible in the state model of FIG. 4, an entry of "N/A" is shown.

FIG. 5 illustrates state transition and received signaling from the point of view of MLA muxer 220 (implemented in one network entity). That is, each MLA muxer 220 may independently transition between states, dependently on received signals. The state transition signals may be generated internally by the MLA muxer 220 itself, or may be received from another MLA muxer 220. Signals between MLA muxers 220 may be communicated using control frames; internally generated signals may be generated by the MLME (in the PHY layer 210).

Each state may be self-looping. Self-looping means that the current state and the next state are the same state. In other words, the state is considered stable. Self-looping is the default state transition that is used in absence of any state transition signals. As indicated in FIG. 5, in some cases self-looping is timed, meaning that after self-looping is performed for a predefined period of time, the current state must transition to a different next state. A predefined self-loop timer may be used locally to keep track of the predefined period of time.

When the current state of the MLA muxer 220 is state 1 (down state 402), state 1 can self-loop to the same state 1 without any associated timer. In other words, the MLA muxer 220 may be in the down state 402 indefinitely, in the absence of any state transition signals. When a ML peering request and response signal (shown in FIG. 4 as MLPeering) is received (which may be a remote signal received from another MLA muxer 220, for example via a control frame), the MLA muxer 220 transitions to state 2 (initialization state 404). If the MLA muxer 220 is the entity that is initiating a multi-link, then the MLA muxer 220 transitions from state 1 to state 2 after determining that its local air interfaces are ready for MLA. State 1 does not transition directly to state 3 (operational state 406) or state 4 (maintenance state 408).

When the current state of the MLA muxer 220 is state 2 (initialization state 404), state 2 transitions back to state 1 (down state 402) when a MLME_peeringMLTimeout signal (shown in FIG. 4 as PeeringTimeOut) is received (which may be an internally generated signal from the MLME, when a peering timer maintained by the MLME expires). This means that initialization and peering is attempted only for a predefined period of time, and if peering is not successful within this period of time the MLA initialization has failed. State 2 can self-loop to the same state 2 for a predefined period of time, which may or may not be the same time duration as the peering timer described above. A local self-loop timer may start when MLA peering procedure is started, and may run until MLA peering is successful. If the self-loop timer expires, the MLA muxer 220 may consider expiration of the self-loop timer to be equivalent to a failed MLA attempt and may transition back to state 1. The timer for the self-loop may serve as a fail-safe feature, such that the MLA muxer 220 does not remain locked in the initialization state 404 in case of any error. When a MLME_MLAPeeringSuccess signal (shown in FIG. 4 as MLPeeringSuccess) is received (which may be an internally generated signal from the MLME, when the MLME receives indication that MLA was successfully established), the MLA muxer 220 transitions to state 3 (operational state 406). State 2 does not transition directly to state 4 (maintenance state 408).

When the current state of the MLA muxer 220 is state 3 (operational state 406), state 3 transitions directly back to state 1 (down state 402) when a MLME_forcedMLDown signal (shown in FIG. 4 as ForceMLDown) is received (which may be an internally generated signal from the MLME). The MLME_forcedMLDown may be internally generated in order to force MLA to end at the network entity, and may be used in situations where the network entity (e.g., the AP 102) determines that MLA should not be used (e.g., if an expected acknowledgement is not received, thus indicating that a remote air interface at the other end of the aggregated link has failed; or if a local air interface is detected as having a down or error status). State 3 does not transition directly to state 2 (initialization state 404). State 3 can self-loop to the same state 3 for a predefined period of time. If, after expiry of the timer, no traffic is transmitted/received over the aggregated link, the MLA muxer 220 automatically transitions to state 4 (maintenance state 408). If traffic is received, the timer is reset. Alternatively, if traffic is received, the timer is paused and resumed when traffic ends. A local timer for the self-loop may serve to ensure that maintenance for the aggregated link is performed quasi-periodically (e.g., about every 100 ms). The quasi-periodic nature of the transition to state 4 is to ensure that the operation of the aggregated link is performed sufficiently frequently, but that transmission/reception of data is not interrupted by the transition to state 4. State 3 also transitions to state 4 when a ML Timed Measurement signal (shown in FIG. 4 as MLTimedMeasurement) is received (which may be a remote signal received from another MLA muxer 220, for example via a control frame). The ML Timed Measurement signal functions similarly to the self-loop timer described above, but is dependent on a remote timer running on another MLA muxer 220 (e.g., at the other end of an aggregated link).

When the current state of the MLA muxer 220 is state 4 (maintenance state 408), state 4 transitions directly back to state 1 (down state 402) when a MLME_forcedMLDown signal (shown in FIG. 4 as ForceMLDown) is received (which may be an internally generated signal from the MLME). The MLME_forcedMLDown may be internally generated in order to force MLA to end at the network entity, and may be used in situations where the network entity (e.g., the AP 102) determines that MLA should not be used (e.g., if an expected acknowledgement is not received, thus indicating that a remote air interface at the other end of the aggregated link has failed; or if a local air interface is detected as having a down or error status). When the MLA muxer 220 is in state 4, measurement of multi-link operation is performed by the MLME. If the MLME fails to obtain the required measurement, the MLME generates an internal signal MLME_measurementMLFailure (shown in FIG. 4 as MLMaintenanceFailure), which causes the MLA muxer 220 to transition from state 4 to state 2 (initialization state 404), which may enable reconfiguration of the aggregated link. If the MLME successfully obtains the required measurement, the MLME generates an internal signal MLME_measurementMLSuccess (shown in FIG. 4 as MLMaintenanceSuccess), which causes the MLA muxer 220 to transition from state 4 to state 3 (operational state 406), to continue operation of the currently established aggregated link. State 4 can self-loop to the same state 4 for a predefined period of time. A local self-loop timer may start when MLA maintenance is started, and may run until MLA maintenance is complete (either MLME measurement is successful or fails). If the self-loop timer expires, the MLA muxer 220 may consider expiration of the self-loop timer to be equivalent to a failed MLME measurement attempt and may transition back to state 2. The timer for the self-loop may serve as a fail-safe feature, such that the MLA muxer 220 does not remain locked in the maintenance state 408 in case of any error.

Further details for some of the state transitions will be described below.

Figure 6:
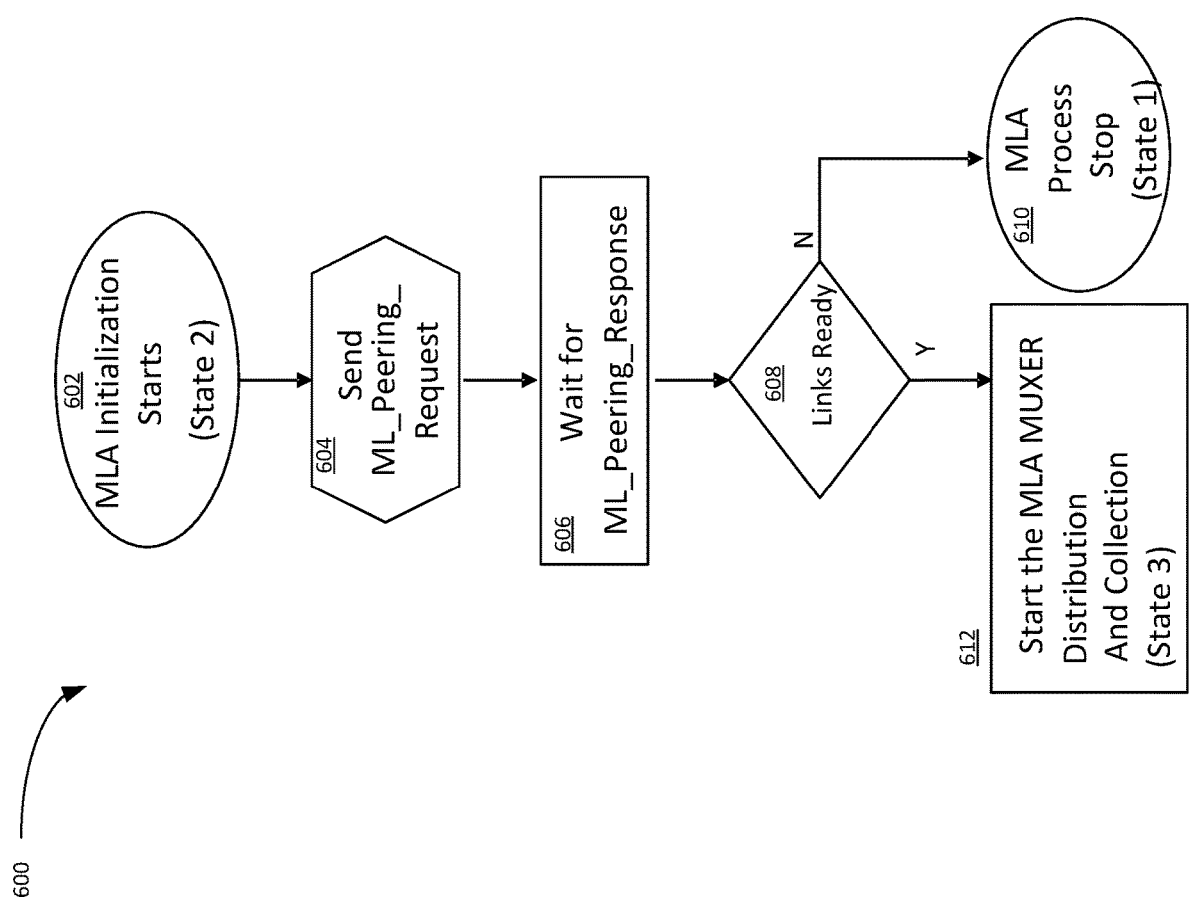
FIG. 6 is a flowchart illustrating an example method for transitioning from MLA initialization to MLA operation.

FIG. 6 is a flowchart illustrating an example method 600 for transitioning from the initialization state 404 (state 2) to the down state 402 (state 1) or the operational state 406 (state 3). The method 600 may be referred to as a method for initializing MLA (also referred to as initializing multi-link peering or simply initializing peering). Generally, MLA is initialized between at least two MLA muxers 220 (one at each end of the aggregated link), with a first MLA muxer 220 being the MLA initiator (or the master) and a second MLA muxer 220 being the MLA respondent. The method 600 may be performed by the MLA muxer 220 that is the MLA initiator. Typically, the MLA initiator may be the AP 102 and the MLA respondent may be a STA 104 associated with the AP 102. However, in some examples, the MLA initiator may be the STA 104 and the MLA respondent may be the AP 102 or another STA 104. For simplicity, the following discussion may be understood in the context of the AP 102 as the MLA initiator and the STA 104 as the MLA respondent, however it should be understood that this is not intended to be limiting.

At 602, the first MLA muxer 220 (also referred to as the MLA initiator for simplicity) starts MLA initialization in state 2 (initialization state 404). For example, step 602 may take place when the MLA initiator transitions from state 1

(down state 402) to state 2 (e.g., after checking the readiness of its local air interfaces, for example after checking that the interfaces are operational and/or have low error rate).

At 604, the MLA initiator sends a signal to the second MLA muxer 220 (also referred to as the MLA respondent for simplicity) to indicate a request for multi-link peering. For example, the signal may be in the form of a control frame (or management frame) generated by the MLA initiator and sent via an air interface to the MLA respondent. This signal may be referred to as a ML_Peering_Request signal. The ML_Peering_Request signal may include information indicating the availability of the air interfaces at the MLA initiator and identifying information about the available air interfaces (e.g., MAC address of the air interfaces and/or virtual MAC address of the MLA initiator), among other possible information.

At the MLA respondent, the receipt of the ML_Peering_Request signal causes the MLA respondent to transition from state 1 to state 2. The MLA respondent, in state 2, performs operations to determine availability of its own air interfaces. The MLA respondent sends a signal back to the MLA initiator to provide information about the availability of air interfaces at the MLA respondent and identifying information about the available air interfaces (e.g., MAC address of the air interfaces and/or virtual MAC address of the MLA respondent), among other possible information. The reply signal may be in the form of a management frame, and may be referred to as a ML_Peering_Response signal.

At 606, the MLA initiator waits for the response (e.g., ML_Peering_Response signal) from the MLA respondent. Optionally, the MLA initiator may start a timer (e.g., a peering timer managed at the MLME), and if the timer expires before the response signal from the MLA respondent is received, the MLA initialization may be considered to have failed, the MLA initiator returns to state 1, and the method 600 ends.

If the response from the MLA respondent is received (before expiry of the peering timer if used), the response should include information about available air interfaces and their identifiers (e.g., MAC address) at the MLA respondent.

At 608, the MLA initiator checks that its local air interfaces are ready for multi-link peering. This check may include determining level of congestion and/or current traffic load of the local air interfaces.

If the MLA initiator determines that its local air interfaces are not ready, then the method 600 proceeds to step 610. At 610, the MLA initiator ends the MLA initialization process and returns to state 1, and the method 600 ends. Optionally, the MLA initiator may also send a signal to the MLA respondent to indicate that MLA initialization has failed and enable the MLA respondent to return to state 1.

If the MLA initiator determines that its local air interfaces are ready, then the method 600 proceeds to step 612. At 612, MLA initialization is successful. The MLA initiator transitions to state 3 and begins distribution and collection functions (e.g., using the MSDU distributor 222 and MSDU collector 224, respectively). Optionally, the MLA initiator may also send a signal to the MLA respondent to indicate that MLA initialization is successful and enable the MLA respondent to transition to state 3. The method 600 ends.

Figure 7:
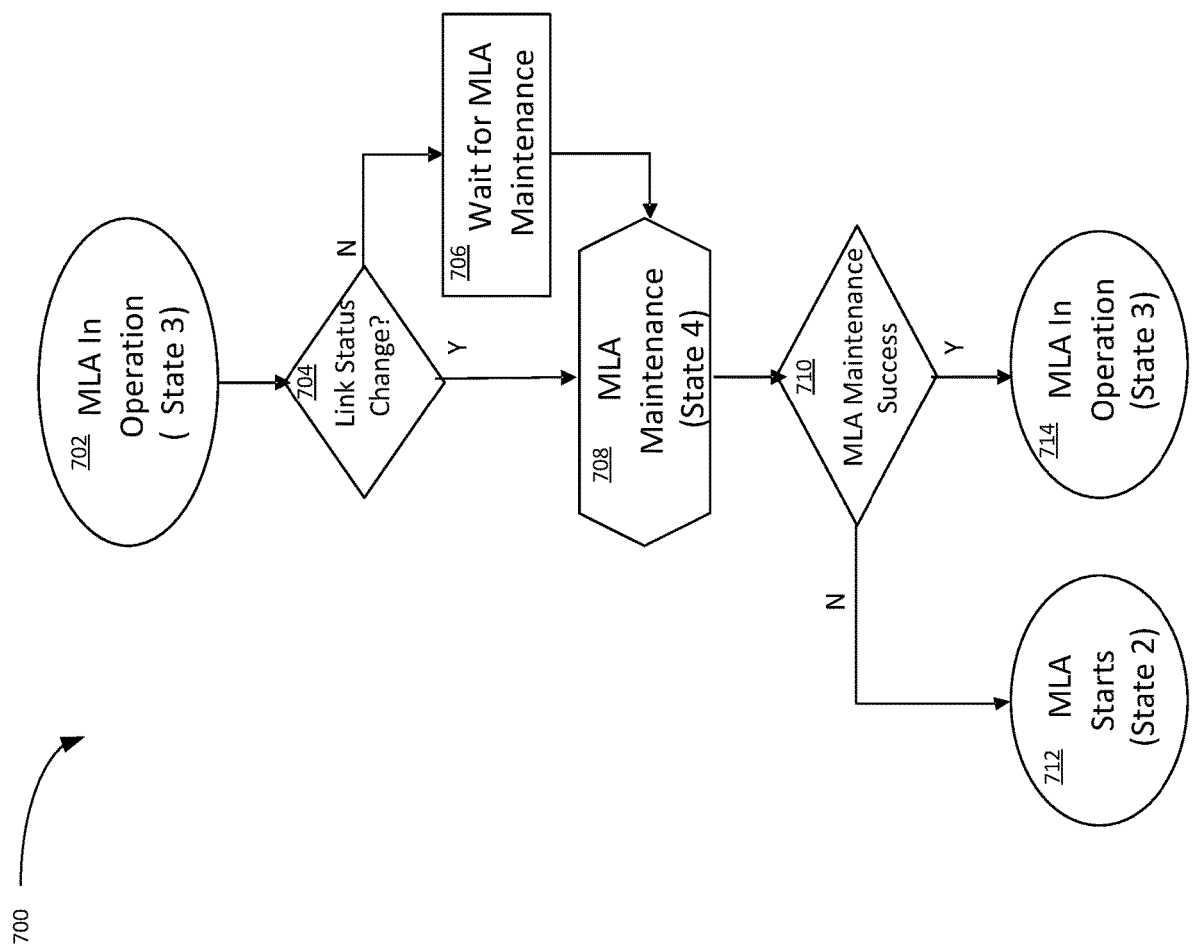
FIG. 7 is a flowchart illustrating an example method for transitioning from MLA operation to MLA maintenance.

FIG. 7 is a flowchart illustrating an example method 700 for transitioning from the operational state 406 (state 3) to the maintenance state 408 (state 4) and back. The method 700 may be referred to as a method for MLA maintenance. Generally, MLA maintenance may be performed locally by the MLA muxer 220 at each end of an aggregated link. The method 700 may be performed by the MLA muxer 220 at the AP 102 or at the STA 104, for example.

At 702, the MLA muxer 220 is in operational state 406 (state 3), with MLA currently in use over a plurality of subordinate air interfaces (which have been designated to serve aggregated traffic over the aggregated link).

At 704, the MLA muxer 220 monitors operation of the subordinate local air interfaces (i.e., the air interfaces corresponding to the end of the aggregated link that is local to the MLA muxer 220).

If there is no change to the state of the subordinate air interfaces, then the subordinate air interfaces are all operating as normal. The method 700 then proceeds to step 706 to wait until MLA maintenance is needed. For example, a self-loop timer may be used to ensure that MLA maintenance is performed quasi-periodically, or a remote signal may be received to transition to state 4 (e.g., as described above with respect to FIG. 5). Other techniques may be used to trigger MLA maintenance (e.g., other internal or remote signals may trigger MLA maintenance). After waiting for a timer (or other trigger) for MLA maintenance, the method 700 proceeds to step 708.

Returning to step 704, if the status of one or more subordinate air interfaces changes (e.g., indicating one or more subordinate air interfaces is no longer operational or has significantly degraded), then maintenance and/or reconfiguration of the aggregated link may be required to keep MLA operational. The method 700 proceeds to step 708.

At 708, the MLA muxer 220 transitions to maintenance state 408 (state 4) and begins the MLA maintenance and reconfiguration process. MLA maintenance and reconfiguration may include, for example, redistributing traffic away from a degraded air interface, among other possible functions.

At 710, the MLA muxer 220 determines whether MLA maintenance was successful. For example, as described with reference to FIG. 5 above, the MLA muxer 220 may receive a local signal from the MLME indicating whether multi-link measurement was successful or unsuccessful.

If MLA maintenance was unsuccessful (e.g., MLME_measurementMLFailure signal was received), then the method 700 proceeds to step 712. At 712, the MLA muxer 220 transitions to state 2 for reconfiguration. The method 700 ends.

If MLA maintenance was successful (e.g., MLME_measurementMLSuccess signal was received), then the method 700 proceeds to step 714. At 714, the MLA muxer 220 transitions back to state 3 to continue MLA operation. The method 700 ends.

As previously mentioned, a function that is provided by the MLA muxer 220 is synchronizing data transmission/reception over the aggregated link. The subordinate air interfaces in the aggregated link function independently from each other. This means that each subordinate air interface may have different contention window and link speeds. Accordingly, synchronization of data transmission/reception may be necessary in order for transmission and reception over the aggregated link to start and stop at the same time over all subordinate air interfaces. Some example synchronization operations are now described, which may be provided by the MLA muxer 220 (e.g., using the MLA MLME-SAP 226).

Figure 8:
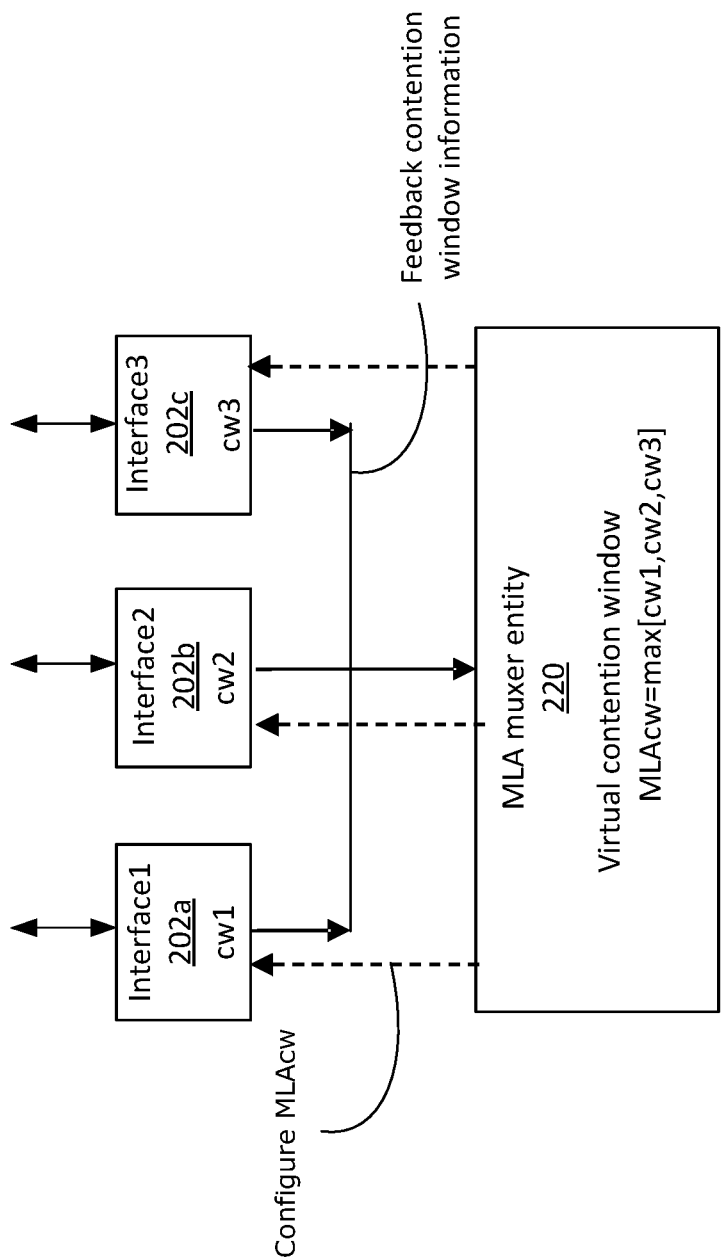
FIG. 8 is a block diagram illustrating an example of contention window synchronization.

FIG. 8 is a block diagram illustrating an example of contention window synchronization, which may be performed by the MLA muxer 220 using the MLA MLME-SAP 226. For the sake of illustration, FIG. 8 shows three subordinate interfaces for the aggregated link. It should be understood that there may be a fewer or greater number of subordinate air interfaces in the aggregated link.

Contention window synchronization may be performed at the start of MLA transmission, by the MLA muxer 220 at the transmitting end of the aggregated link. At the start of MLA transmission, the MLA muxer 220 obtains information from each local subordinate interface 202a, 202b, 202c to determine the contention window cw1, cw2, cw3, respectively, of each subordinate interface 202a, 202b, 202c. For example, virtual contention (e.g., as defined in IEEE 802.11 standards) may be used by the MLA muxer 220 to obtain this information. Using the information fed back from each subordinate interface 202a, 202b, 202c, the MLA muxer 220 sets a contention window to be used for the MLA transmission (referred to as the MLAcw) that is the largest contention window among the subordinate interfaces 202a, 202b, 202c. This may be expressed mathematically as:

$$MLAcw = \text{Max}(cw_1, cw_2, cw_3)$$

The MLA muxer 220 configures all local subordinate air interfaces 202a, 2020b, 202c to use the MLA contention window.

Figure 9:
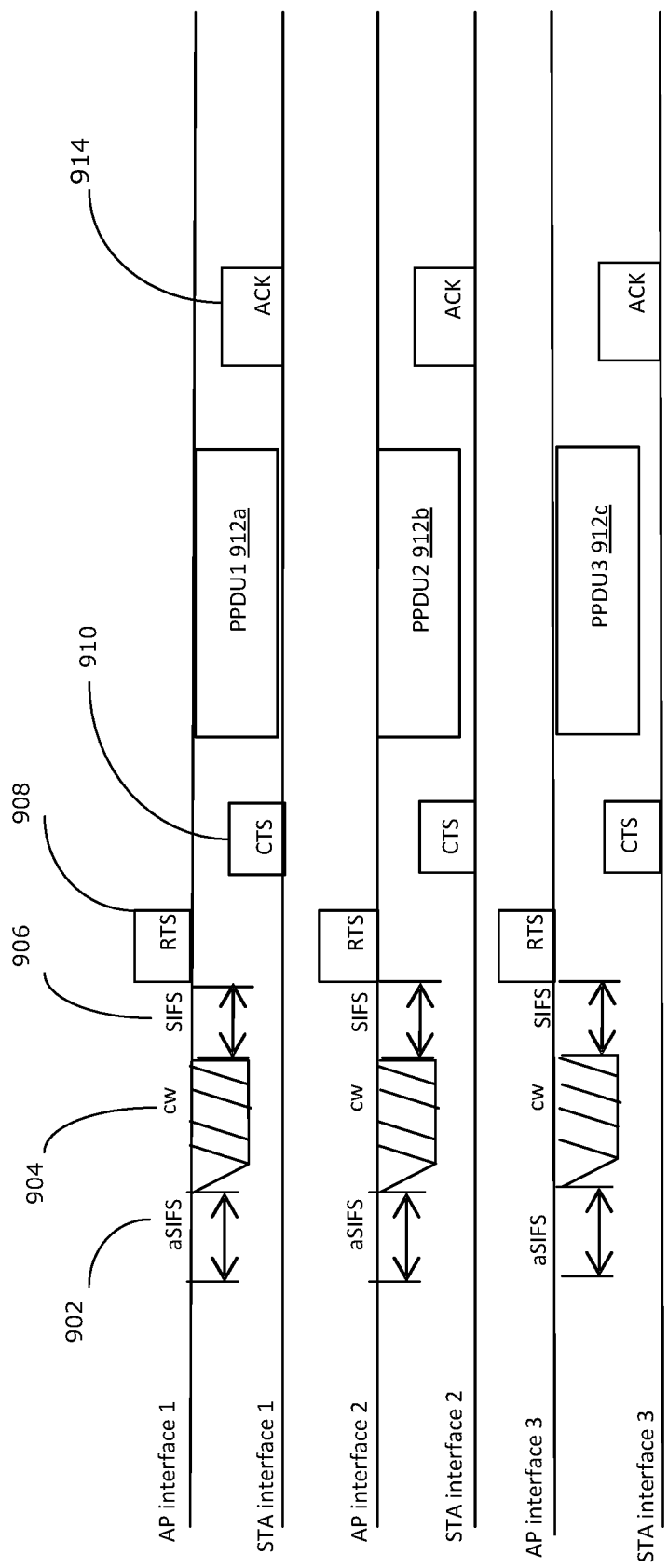
FIG. 9 is a timing diagram illustrating an example of MLA synchronization.

FIG. 9 is a timing diagram illustrating a further example of MLA synchronization. In this example, MLA transmission takes place between a transmitting network entity (in this case, the AP 102) and a receiving network entity (in this case, the STA 104). In other examples, the transmitting network entity may be the AP 102 or a STA 104, and the receiving network entity may be the AP 102 or a STA 104. For the sake of illustration, three subordinate interfaces are shown (interface 1, 2 and 3 at each of the AP and the STA), however it should be understood that there may be greater or fewer numbers of subordinate interfaces for the MLA transmission. The subordinate air interfaces at the AP 102 may be generally referred to as AP interface (numbered 1, 2 and 3 specifically); and the subordinate air interfaces at the STA 104 may be generally referred to as STA interface (numbered 1, 2 and 3 specifically). In this example, the transmitting network entity is communicating with one receiving network entity over three aggregated links. However, it should be understood that this is not intended to be limiting. For example, in some cases each STA interface may represent a full protocol stack of a respective STA.

Prior to the transmission shown in FIG. 9, the MLA muxer 220 should determine that each air interface is ready for transmission (e.g., at step 608 of FIG. 6 described above), so that transmission can begin at the same time over all subordinate interfaces.

As illustrated, all the AP interfaces, following an arbitrary short interframe space (aSIFS) time 902, use the same contention window duration 904 configured by the MLA muxer 220 (i.e., the MLAcw described above). Following the contention window 904 and another short interframe space (SIFS) 906, each AP interface transmits a request to send (RTS) frame 908 to a respective STA interface. Each STA interface responds with a clear to send (CTS) frame 910 response back to the respective AP interface. This process initiates the synchronized (or quasi-synchronized) channel access. This may be referred to as "quasi-synchronized" channel access even though the end result is effectively synchronization of transmissions, because the synchronization is not based on common timing signaling, but rather reliant on having equal-length contention window on each interface and equal RTS/CTS timing.

Respective data (e.g., respective physical protocol data unit (PPDU) 912a, 912b, 912c) are transmitted over each air interface between the AP 102 and STA 104. For example, the MLA muxer 220 (e.g., using the MSDU distributor 222) may assign data to each subordinate interface to be transmitted. At the end of the MLA transmission, each STA interface responds with corresponding acknowledgements (ACKs) 914 in the reverse direction of the links. The ACKs 914 may enable the MLA muxer 220 at the AP 102 to readily detect the status of each air interface.

It should be noted that the data 912a, 912b, 912c transmitted over each air interface may be of different size, and also that each air interface may have different link speeds (in other words, there may be unbalanced transmission over the aggregated link). To ensure load balancing, such that reception ends at the same time in each subordinate interface, the MLA muxer 220 at the transmitting entity (the AP 102 in this example) may pad the transmitted data. For example, data transmission over a faster link may be padded to balance with data transmission over a slower link. Any suitable padding algorithm may be used. Such data padding may be performed using flow control and load balancing functions of the MLA muxer 220 (e.g., using the MLA MLME-SAP 226).

The present disclosure also describes example frame formats, which may enable a MLA muxer 220 at a receiving end to identify whether a given data transmission is a MLA management frame or a data frame belonging to a MLA data flow, and if it is a data frame which MLA data flow the data frame belongs to. It may be necessary to identify data frames in this way because each individual subordinate air interface functions independently, such that data over different subordinate interfaces may arrive out of order and/or may be interspersed with data belonging to different data flows. This information may be used by the MLA muxer 220 at the receiving end to correctly collect and reassemble the data (e.g., using the MSDU collector 224).

Figure 10:
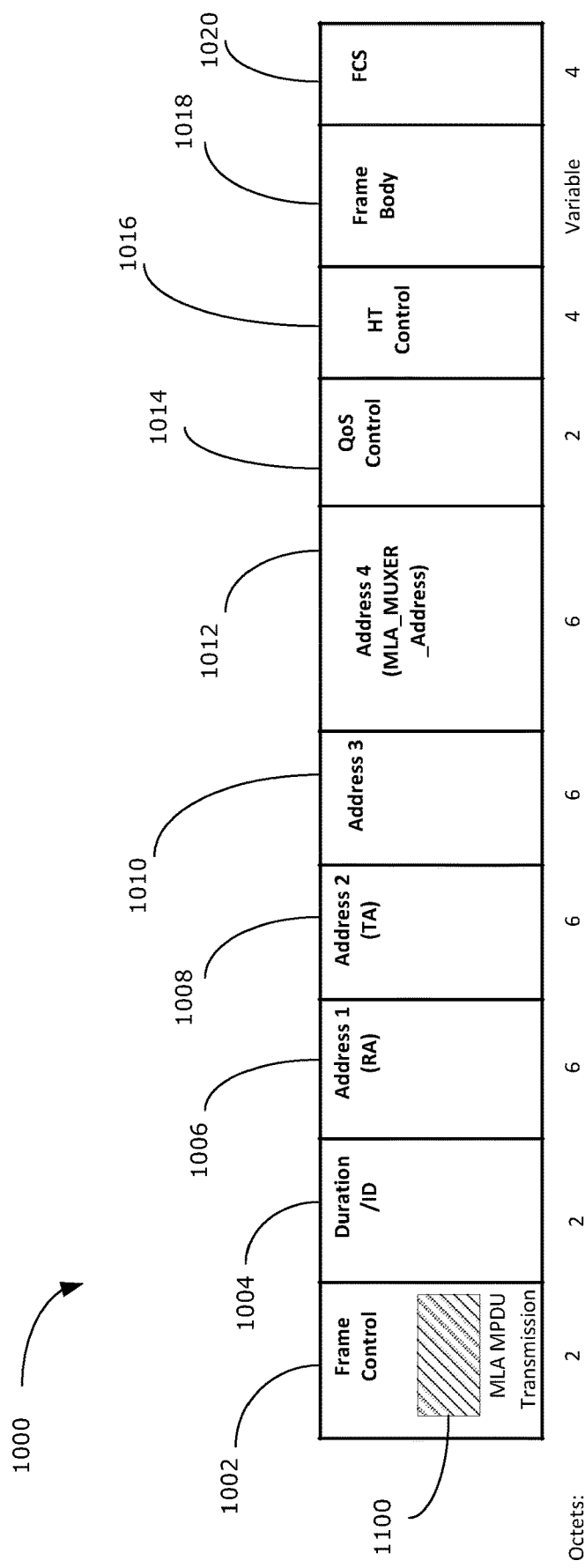
FIG. 10 illustrates an example MLA MPDU frame format.

FIG. 10 illustrates an example MLA MPDU frame format 1000, showing the details of some example fields. The example frame format 1000 is generally based on existing MPDU frame formats (e.g., in accordance with existing IEEE 802.11 standards), but adapted for MLA transmission as discussed below.

The example frame format 1000 includes a frame control field 1002, which includes a MLA MPDU transmission indication 1100 (discussed further below). The example frame form 1000 includes a duration/ID field 1004, which indicates duration or association identifier information. The example frame format 1000 also includes an address 1 field 1006 identifying the receiver (e.g., indicating the receiving address (RA)); an address 2 field 1008 identifying the transmitter (e.g., indicating the transmitter address (RA)); an address 3 field 1010; and an address 4 field 1012. The address 4 field 1012 may be used to identify MLA muxer 220 at the transmitter, for example by indicating the logical MAC address (shown in FIG. 10 as MLA_MUXER_Address) of the MLA muxer 220 at the transmitter. The information contained in the address 4 field 1012 may be used at the receiving MLA muxer 220 to check whether the received MPDU is from the same transmitting MLA muxer 220 as a current data flow, or from a different MLA muxer 220 (which may indicate that the MPDU belongs to a different data flow). This may enable the receiving MLA muxer 220 to correctly collect MPDUs belonging to the same data flow, and correctly reassemble the data.

The example frame format 1000 also includes a quality of service (QoS) control field 1014, a high throughput (HT) control field 1016, a frame body 1018 (which contains data content) and a frame check sequence (FCS) field 1020.

Figure 11A:
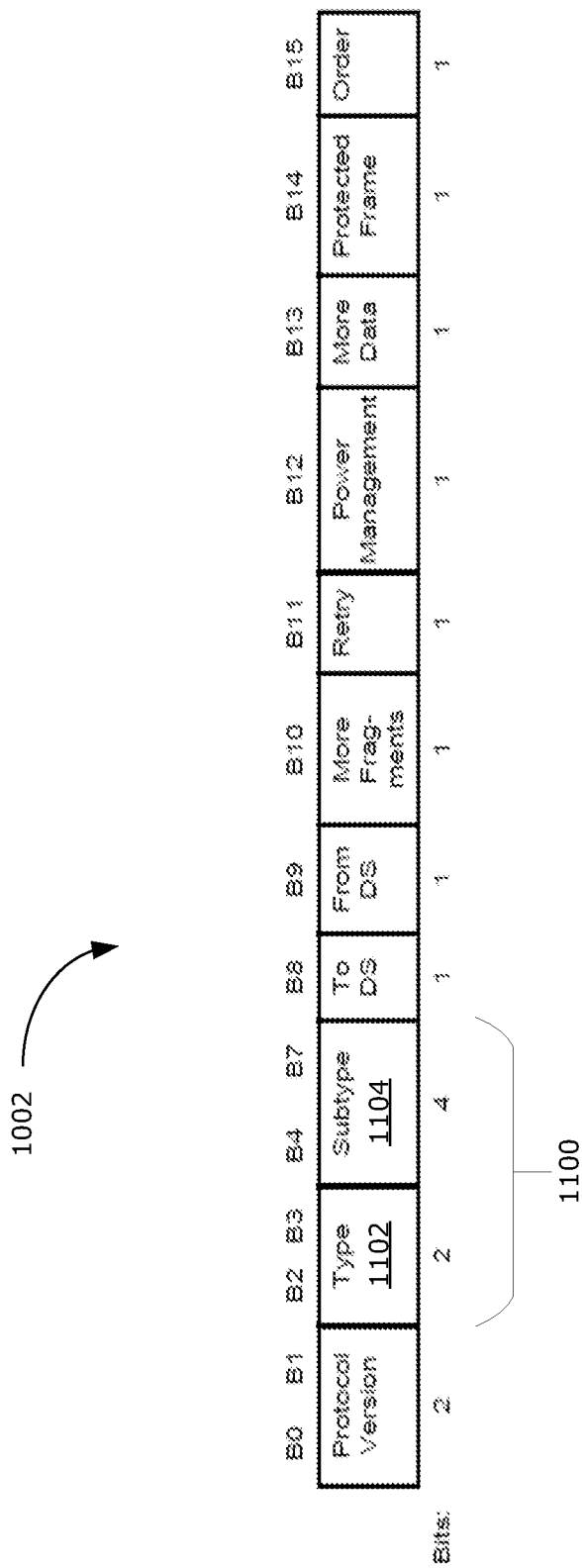

FIGS. 11A and 11B show details of an example frame control field 1002, including indication for MLA MPDU data transmission. Although these examples illustrate the use of certain bit values in certain fields, it should be understood that these are only for the purpose of illustration and are not intended to be limiting.

FIG. 11A shows the information carried in each bit of an example 2-octet long frame control field 1002. In particular, the frame control field 1002 may use the 2-bit type field 1102 and the 4-bit subtype field 1104 as the MLA MPDU transmission indicator 1100. Other bit values in the frame control field 1002 may be similar to existing standard definitions.

FIG. 11B is a table that shows example bit values that may be carried in the type field 1102 and the subtype field 1104. For example, a bit value of "00" in the type field 1102 and bit value of "1111" in the subtype field 1104 may be used to indicate the MPDU is a MLA management frame transmission; a bit value of "10" in the type field 1102 and bit value of "1101" in the subtype field 1104 may be used to indicate the MPDU is a MLA MPDU data transmission.

In various examples, the present disclosure has described a reference architecture for supporting MLA of air interfaces. In the disclosed reference architecture, the MLA muxer logical layer is provided on top of existing PHY layer. Using such an added layer may enable MLA functions to be implemented relatively easily, without requiring significant changes to existing security procedures. Air interfaces that are in ready and associated state may function independently, while serving as subordinate interfaces carrying aggregated traffic.

The MLA muxer may be implemented using a state machine, and may include a maintenance state (which is used on a quasi-periodic basis), to enable relatively quick and near real-time maintenance and reconfiguration of the aggregated link, when there is a change in the states of the air interfaces. The MLA muxer may readily transition between states to switch between aggregated and non-aggregated operation. The MLA muxer provides synchronization functions, to manage transmission and reception over multiple air interfaces (that otherwise function independently of each other).

In some examples, frame formats have been described to enable correct identification and demuxing (reassembly) of MLA transmissions at the receiver. The disclosed examples may help to reduce the risk of duplication and/or misordering of transmissions.

Because the MLA muxer is a logical layer that sits on top of existing PHY layer, the MLA muxer does not impact existing security for individual interfaces. The security of data transmission may be ensured, using existing security protocols.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus for wireless communications comprising:
a network interface supporting a plurality of air interfaces for wireless communication with at least one network entity; and
a processor coupled to the network interface, the processor being configured to execute instructions to:
implement a multi-link aggregation (MLA) multiplexer (muxer) as a logical layer, the MLA muxer providing at least a synchronization function to synchronize data transmission to the at least one network entity, the transmission being conducted over two or more subordinate air interfaces belonging to an aggregated link;
wherein the synchronization function includes:
obtaining information from each of the two or more subordinate air interfaces about a duration of a respective contention window; and
configuring each of the two or more subordinate air interfaces to use a new contention window that is a maximum of the respective contention windows.

2. The apparatus of claim 1, wherein implementation of the MLA muxer comprises:
a data distributor responsible for assigning data to each subordinate air interface for transmission;
a data collector responsible for receiving data from each subordinate air interface and reassembling the received data; and
a MLA manager providing at least the synchronization function.

3. The apparatus of claim 1, wherein each subordinate air interface maintains a respective independent security association for data transmission.

4. The apparatus of claim 1, wherein the MLA muxer operates in one of:
a down state in which the plurality of air interfaces do not participate in any aggregated link;
an initialization state in which the MLA muxer communicates with the at least one network entity to establish the aggregated link using the two or more subordinate air interfaces;

an operational state in which transmission to the at least one network entity is conducted over the aggregated link; or a maintenance state in which the MLA muxer obtains information about operational status of each subordinate air interface to ensure links established over each subordinate air interface are operational.

5. The apparatus of claim 4, wherein the MLA muxer transitions from the operational state to the maintenance state after expiry of a timer.

6. The apparatus of claim 5, wherein the timer is paused or reset when there is traffic over the aggregated link.

7. The apparatus of claim 1, wherein the synchronization function further comprises:

for at least one subordinate air interface, padding transmission over the at least one subordinate air interface, to cause data transmission over each subordinate air interface to end synchronously.

8. The apparatus of claim 1, wherein the data transmitted over the aggregated link is a MAC protocol data unit (MPDU) having a frame format, wherein the frame format includes an address field indicating a logical MAC address associated with the MLA muxer, to indicate a source of the MPDU.

9. The apparatus of claim 8, wherein the frame format further includes a frame control field containing bit values indicating a message type of the MPDU.

10. A method for wireless communications, the method comprising:

implementing a multi-link aggregation (MLA) multiplexer (muxer) as a logical layer, the MLA muxer providing at least a synchronization function to synchronize data transmission to at least one network entity, the transmission being conducted over two or more subordinate air interfaces belonging to an aggregated link;

wherein the synchronization function includes:
obtaining information from each of the two or more subordinate air interfaces about a duration of a respective contention window; and
configuring each of the two or more subordinate air interfaces to use a new contention window that is a maximum of the respective contention windows.

11. The method of claim 10, wherein implementing the MLA muxer comprises implementing:

a data distributor responsible for assigning data to each subordinate air interface for transmission;
a data collector responsible for receiving data from each subordinate air interface and reassembling the received data; and
a MLA manager providing at least the synchronization function.

12. The method of claim 10, wherein each subordinate air interface maintains a respective independent security association for data transmission.

13. The method of claim 10, wherein the MLA muxer operates in one of:

a down state in which the plurality of air interfaces do not participate in any aggregated link;
an initialization state in which the MLA muxer communicates with the at least one network entity to establish the aggregated link using the two or more subordinate air interfaces;
an operational state in which transmission to the at least one network entity is conducted over the aggregated link; or
a maintenance state in which the MLA muxer obtains information about operational status of each subordinate air interface to ensure links established over each subordinate air interface are operational.

14. The method of claim 13, wherein the MLA muxer transitions from the operational state to the maintenance state after expiry of a timer.

15. The method of claim 14, wherein the timer is paused or reset when there is traffic over the aggregated link.

16. The method of claim 10, wherein the synchronization function further comprises:

for at least one subordinate air interface, padding transmission over the at least one subordinate air interface, to cause data transmission over each subordinate air interface to end synchronously.

17. The method of claim 10, wherein the data transmitted over the aggregated link is a MAC protocol data unit (MPDU) having a frame format, wherein the frame format includes an address field indicating a logical MAC address associated with the MLA muxer, to indicate a source of the MPDU.

18. The method of claim 17, wherein the frame format further includes a frame control field containing bit values indicating a message type of the MPDU.

19. A non-transitory computer-readable medium having instructions encoded thereon, wherein the instructions, when executed by a processor of an apparatus, cause the apparatus to:

implement a multi-link aggregation (MLA) multiplexer (muxer) as a logical layer, the MLA muxer providing at least a synchronization function to synchronize data transmission to at least one network entity, the transmission being conducted over two or more subordinate air interfaces belonging to an aggregated link;

wherein the synchronization function includes:
obtaining information from each of the two or more subordinate air interfaces about a duration of a respective contention window; and
configuring each of the two or more subordinate air interfaces to use a new contention window that is a maximum of the respective contention windows.

20. The non-transitory computer-readable medium of claim 19, wherein the MLA muxer operates in one of:

a down state in which the plurality of air interfaces do not participate in any aggregated link;
an initialization state in which the MLA muxer communicates with the at least one network entity to establish the aggregated link using the two or more subordinate air interfaces;
an operational state in which transmission to the at least one network entity is conducted over the aggregated link; or
a maintenance state in which the MLA muxer obtains information about operational status of each subordinate air interface to ensure links established over each subordinate air interface are operational.

* * * * *